UNITED STATES PATENT OFFICE.

HENRY G. PIFFARD, OF NEW YORK, N. Y.

SALT FOR CATTLE.

SPECIFICATION forming part of Letters Patent No. 296,614, dated April 8, 1884.

Application filed March 5, 1884. (No specimens.)

*To all whom it may concern:*

Be it known that I, HENRY G. PIFFARD, a citizen of the United States, and a resident of New York, in the county of New York and State of New York, have invented certain new and useful Improvements in Cattle-Salt, of which the following is a specification.

The object of my invention is to furnish a new and beneficial substitute for the ordinary salt of commerce as commonly used for cattle. In feeding salt in loose form to cattle a great deal is, as is well known, wasted. A further object of my invention is to avoid this waste.

My invention consists of a compound salt suited for feeding the cattle, composed of phosphate of sodium or any other oxide or salt of phosphorus, either free or combined with other substances, and common salt, mixed together in any suitable or desired manner, and preferably compressed or molded into solid and firm bricks or otherwise shaped blocks or forms.

I preferably employ about one per cent. of phosphate in the mixture, but do not limit myself to this precise quantity, and a greater or less proportion of phosphate may be used, as is deemed desirable.

The mixture may be made in any desired manner—as, for instance, by grinding and mixing dry the proper relative weights of the phosphate and the ordinary salt, the mixture thus produced being afterward subjected in proper molds to pressure, so as to reduce it to firm and compact masses of any desired size, which may be fed to cattle without waste, or being otherwise formed into blocks or cakes of such size that they may be readily handled; or, if desired, saturated solutions of the phosphate and the salt may be first made, and the solutions then mixed in the desired proportions, the compound mixture being afterward evaporated.

The compound salt deposited by evaporation may be afterward ground, if necessary, and compressed or formed into solid hard tablets or blocks by any desired means.

What I claim as my invention is—

1. A cattle-salt compounded of common salt and an oxide or salt of phosphorus, in the proportions and as and for the purposes described.

2. As a new article of manufacture, cattle-salt compressed or formed into solid hard tablets or blocks of any desired size and shape, as and for the purpose described.

Signed at New York, in the county of New York, and State of New York, this 4th day of March, A. D. 1884.

HENRY G. PIFFARD.

Witnesses:
 THOS. TOOMEY,
 GEO. C. COFFIN.